Oct. 14, 1969  H. J. A. C. ARENS  3,472,584
SLIDE COMPARATOR
Filed May 26, 1967  4 Sheets-Sheet 3

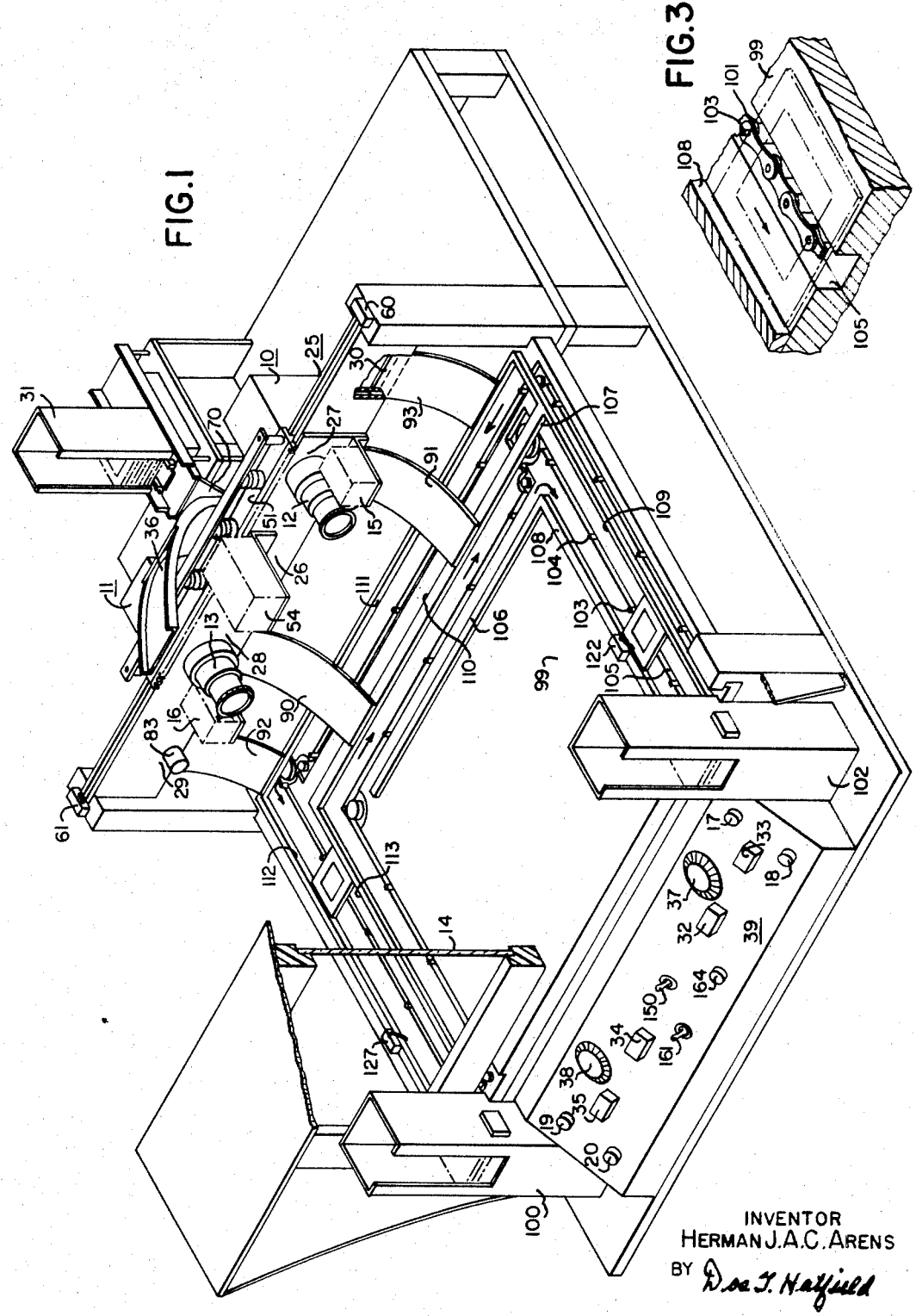

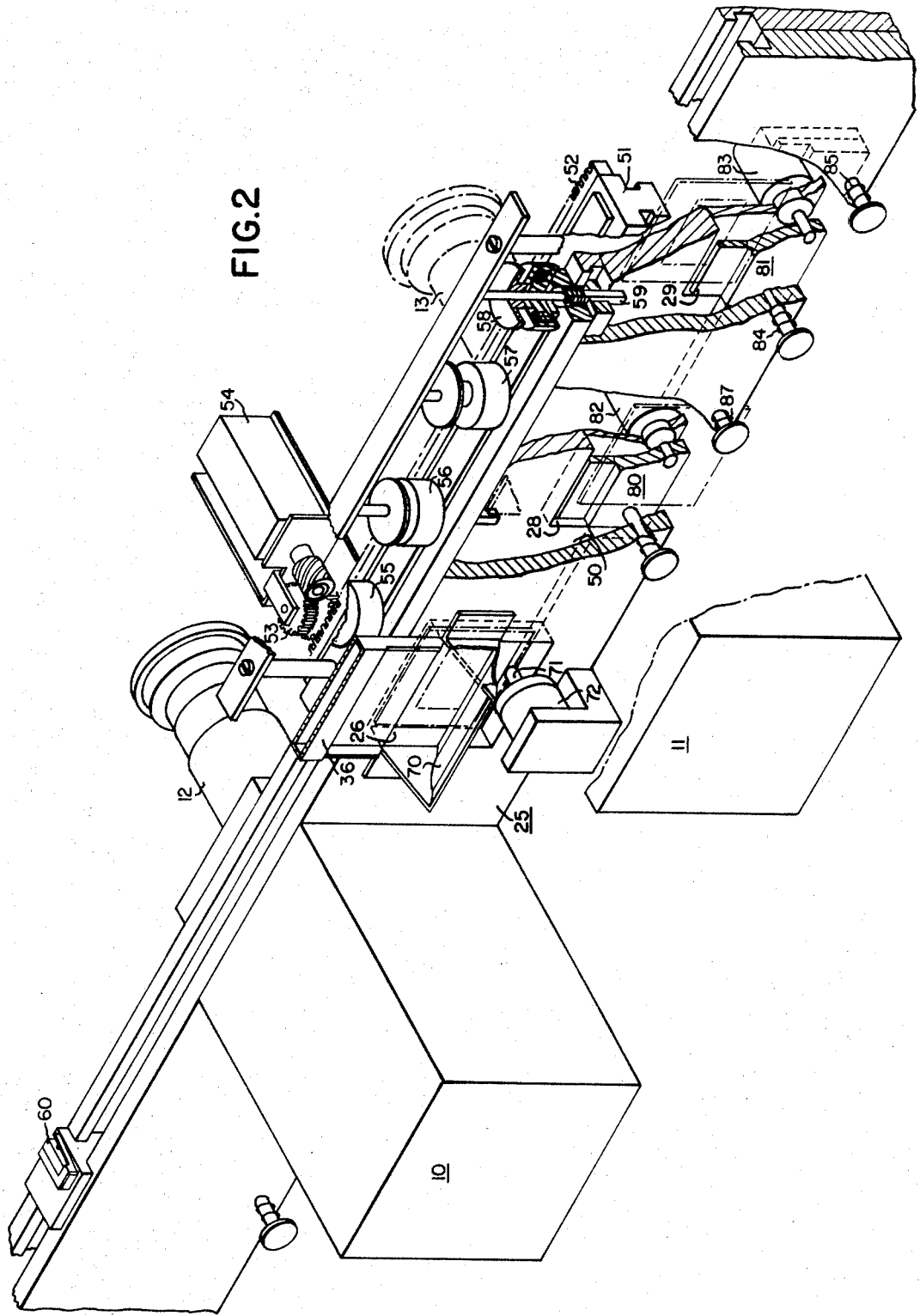

United States Patent Office 3,472,584
Patented Oct. 14, 1969

3,472,584
SLIDE COMPARATOR
Herman J. A. C. Arens, Bethesda, Md., assignor to National Geographic Society, Washington, D.C., a corporation of the District of Columbia
Filed May 26, 1967, Ser. No. 641,651
Int. Cl. G03b 21/00, 21/26, 23/02
U.S. Cl. 353—21   9 Claims

ABSTRACT OF THE DISCLOSURE

A pair of slide transparency projection and viewing assemblies are positioned in side-by-side spaced apart relation with associated slide transport apparatus and control apparatus therefor. Slides are selectively conveyed from a central hopper to either projection assembly whereby two slides are simultaneously viewed, compared and selectively accepted or rejected. Upon acceptance of one of the slides, the accepted slide is conveyed by an accept slide conveyor to an accept bin wherein the slide is stored. Conversely, upon rejection of one of the slides, the rejected slide is conveyed by a reject slide conveyor to a reject bin wherein the slide is stored.

The present invention relates to slide transparency projection and viewing apparatus.

BACKGROUND OF THE INVENTION

The many commercial and professional people who use photographic slide transparencies for illustrative or decorative purposes are often faced with the problem of selecting one or more slides from a group of slides as the best to be used for their purposes. To facilitate such a selection process, it is very desirable to be able to simultaneously view and compare a pair of slides and to be able to reject or accept one of the pair of slides while either holding the other slide for simultaneous comparison with another newly presented slide or accepting or rejecting the other slide so that another pair of slides may be simultaneously viewed and compared. The subject matter of the invention is a slide transparency comparator which will enable the desired comparison and sorting of the slides to be done with a minimum of confusion and effort on the part of the operator and which by the simple operation of push button switches enables a single quantity of slide transparencies to be separated or sorted into separate accepted and rejected quantities of slides.

PRIOR ART

Considered to be typical of the prior art patents disclosing apparatus for simultaneous projection of two transparenices are the following: 3,025,756, Howell et al., Mar. 20, 1962 and 3,239,955, Amelotte, Mar. 15, 1966. These patents are classified in Class 88, subclass 24, and in Class 40, subclass 79, respectively. No prior art patents are known by applicant to disclose a slide transparency comparator having conveyor and control means therefor operable to enable a slide to be transported to a selected one of two projector positions for simultaneous projection and viewing of two slides and for selectively conveying a slide from a respective projection position to either an accept or reject slide storage bin by the simple operation of switches on a control panel.

SUMMARY

In accordance with the invention, a pair of slide transparency projection lamp, lens and viewing screen assemblies are placed in side-by-side spaced apart relation. A slide input transport conveyor is positioned between the two projection assemblies and is arranged to be controlled to transport a slide from a central position selectively to either one of two projection positions for a selected one of the projection assemblies. The transport conveyor is also arranged to be selectively controlled to transport a slide from either projection position to an accept slide conveyor or to a reject position on the transport conveyor and to transport a slide from either reject position to a reject slide conveyor. The above-mentioned accept slide conveyor is operable to convey a slide to an accept slide storage bin where it is elevated to a position beneath other previously stored accepted slides. Similarly, the reject slide conveyor is operable to convey a slide to a reject slide storage bin where it is elevated to a position beneath other previously stored rejected slides. A slide insert mechanism is provided to automatically insert a single slide from a storage bin into the central position, on the transport conveyor for each slide change cycle and in addition guide means is provided for the optional manual insertion of a given slide onto the transport conveyor at the central position. The invention provides an electrical control panel and associated switches, relays, solenoids and electric motors to enable the selective servo operation of the slide conveyors in any desired combination by the simple operation of push button controls and the like. Further features of the invention will be apparent with reference to the following drawings and specification.

BRIEF DESCRIPTION OF THE DRAWINGS

FIG. 1 is a perspective elevational view of the comparator of the invention as seen from the front with portions of the cabinet and viewing screen broken away for clarity;

FIG. 2 is a perspective elevational view of the projection lamps and transport conveyor only as seen from the rear with parts broken away for clarity;

FIG. 3 is a fragmentary view of a portion of the reject conveyor showing the manner of moving the slide thereon, it being understood that the accept slide conveyor is similar in arrangement;

DESCRIPTION OF THE PREFERRED EMBODIMENT

Figure 4:
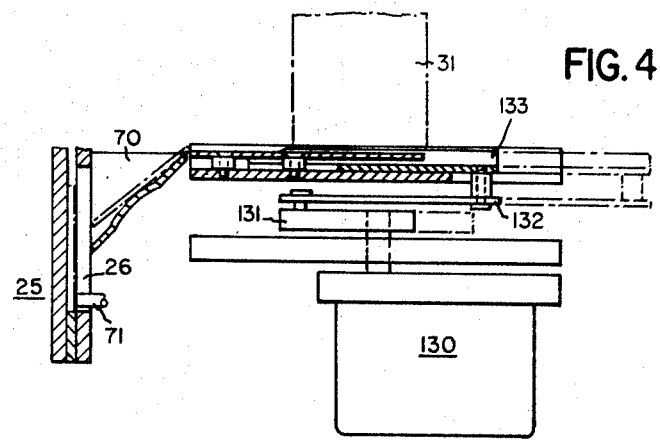
FIG. 4 is a fragmentary view of the automatic slide feeding mechanism for feeding a slide to the central position on the transport conveyor from a stack of slides to be viewed.

Referring first to FIGS. 1–3 of the drawings, a description of the general arrangement of the slide comparator of the invention will be made. The mechanism is shown as it would be seen when removed from its cabinet enclosure and comprises first and second side-by-side and spaced apart projection lamps 10, 11 at the rear of the cabinet with associated lens 12, 13 for projecting upon viewing screens at the front such as the secreen 14. Electric focus motors 15, 16, respectively, are arranged to be controllably operated by focus control push buttons 17–20, respectively, on the front panel.

A slide transport conveyor is generally designated as 25 and is positioned to extend between the projection lamps 10, 11 in a manner to enable a slide to be moved from a central position 26 to either the right projection position 27 or the left projection position 28 or from the respective projection position to the left reject position 29 or the right reject position 30. Also the transport conveyor is arranged as will be later described in more detail to enable a slide to be moved from the respective projection position to the slide accept conveyor. A bin 31 is arranged to contain slides to be individually and automatically advanced to the central position 26 on the transport conveyor whenever a particular one of the right and left slide accept or reject buttons 32–35 are operated as will be later described in more detail. Alternatively, a chute 36 for manually inserting a slide to the central position 26 of the transport conveyor 25 is provided. Knobs 37, 38 for controlling the lamp intensities of the projectors 10, 11 are also provided on the front control panel 39.

Figure 8:
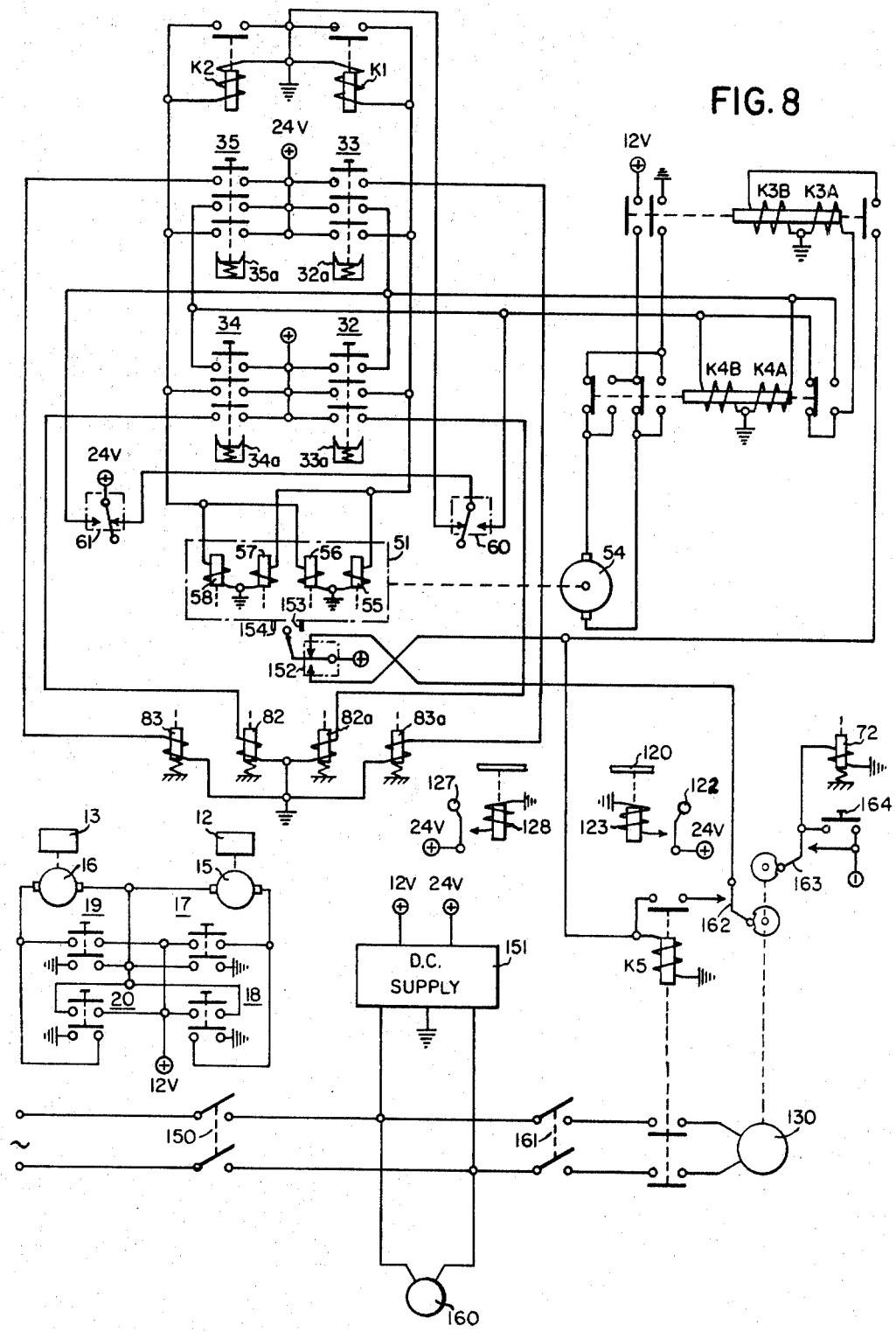
FIG. 8 is a wiring diagram of the control circuit.

The slide transport conveyor 25 is comprised of a trackway 50 upon which slides are supported in upright position to be moved on their bottom edge surfaces selectively to either the right projection position 27 between lamp 10 and lens 12 or the left projection position 28 between lamp 11 and lens 13. A conveyor bracket or drive carriage 51 is slideably positioned on the top of the transport conveyor 25 and is provided with a gear rack 52 driven by the gear 53 and a reversible carriage drive electric motor 54 to be movable either to the left or right from the central positions. As will be later described in connection with the control circuit of the invention, the transport conveyor drive carriage 51 is normally maintained in the central position as shown by FIG. 1 but is movable to the extreme right or left position such as the left position shown by FIG. 2 upon suitable operation of the transport carriage reversible motor 54. The conveyor drive carriage 51 is provided with solenoids 55–58 which when energized project a normally retracted associated pin 59 into the transport track in a manner to engage an upper corner of a slide and move the slide thus engaged as the conveyor drive carriage 51 is moved. More specifically, assuming a slide is to be moved from the central position 26 to the left projection position 28 in front of the lamp 11 and a slide previously in that projection position is to be moved to the left reject position 29, the left drive solenoids 56 and 58 would be energized to project the pin associated with solenoid 56 into a position to the right of the upper corner of the slide in the central position and to project pin 59 into a position to the right of the upper corner of the slide in the left projection position in front of lamp 11. Thereafter, the reversible transport motor 54 is energized in a direction to drive the gear rack 52 and transport drive carriage 51 to the left to the position shown by FIG. 2 of the drawings, thus moving a slide from the central position 26 to the left projection position 28 and also at the same time moving a previously positioned slide from the left projection position 28 to the left reject position 29. As soon as the transport conveyor drive carriage 51 reaches an extreme left or right position a limit switch such as the left position limit switch 61 is engaged to cause the control circuit to de-energize any and all of the drive solenoids 55–58 and to reverse the motor 54, thus returning the transport conveyor drive carriage 51 to the central position but leaving newly positioned slides at the associated projection and reject positions 28, 29. As soon as the transport conveyor carriage 51 is returned to the central position, a central position limit switch 152 which is shown on the circuit diagram of FIG. 8 is engaged to de-energize the transport motor 54 and start the automatic slide insert feed cycle to position the next slide from the hopper 31 at the central position 26 on the slide transport conveyor 25.

More specifically, in reference to FIG. 4 of the drawings, the bottom slide of the stack of slides in the bin 31 is deposited on the inclined chute surface 70 from which it slides into a side opening at the central position of the transport conveyor and a spring pressed finger 71 precisely positions the slide in the vertical edge supported centered relation. During the slide insert cycle the solenoid 72 is energized to withdraw the spring pressed pin 71 so that a slide may move into position but at the end of the slide insert cycle, the solenoid 72 is again de-energized to allow the spring pressed pin to engage the lower back portion of the slide frame and accurately center the slide in the upright position on the transport conveyor track.

At each of the left and right projection and slide reject positions, the transport conveyor track is provided with a movable trap such as the left projection position trap 80 and the left reject position trap 81. Each trap at each left and right projection and reject positions is provided with an associated control solenoid such as the left position solenoids 82, 83. Only one of such solenoids, namely solenoid 83, is shown by FIG. 1 of the drawings in order to provide clarity for the remaining parts shown. The traps are normally maintained in their closed positions by means of the associated compression coil springs such as the springs 84, 85 for trap 81 and springs 86, 87 for trap 80. When an associated solenoid such as the solenoid 82 for trap 80 is energized, the trap will be moved against the force of the associated coil springs such as springs 86, 87 to an open position and any slide at the associated position such as the left projection position 28 being described, will drop out of the transport conveyor 25 onto an associated slide accept chute such as the chute 90 at the left projection position or the accept chute 91 at the right projection position 27. Similarly, reject chutes 92, 93 are associated with the respective traps such as the trap 81 at the left reject position. For example, if it is decided to accept the slide at the left projection position 28, the left accept button 34 would be pressed to momentarily energize solenoid 82 during depression of the button at the same time that the transport conveyor drive carriage motor 54 is started to convey a new slide from the central position 26 to the left projection position 27. Thus the accepted slide would be deposited on the chute 90 to be moved to the accept conveyor to be later described. If, on the other hand, it is decided to reject the slide at the left projection position 28, the left reject button 35 would be depressed so that the reject trap solenoid 83 would be momentarily energized to deposit a previously rejected slide at the left reject position 29 on the reject chute 92 thus clearing the reject position 29 to receive the next rejected slide from the projection position 28 as the next slide to be viewed is simultaneously moved from the central position 26. Slides deposited upon the reject chutes 92, 93 will move to the reject conveyor and thence to the reject bin 100 as will now be described in more detail.

Referring now to FIGS. 1 and 3 of the drawings, a continuously moving endless chain 101 is movable along a serpentine path from the reject bin 100 to the accept bin 102 and in front of the slide deposit chutes 90–93 back to the reject bin 100. More particularly the endless chain is provided with a plurality of spaced pins such as shown at 103 and 104 which project up through a track slot 105 in the conveyor table surface 99. The conveyor chain 101 is movable in the direction of the arrows and accepted slides are deposited by either accept chute 90 or 91 to be moved to the right and forward as propelled by a conveyor pin such as the pin 103 and guided by slide rails 106–109 to the accept bin 102. Similarly, rejected slides are deposited by either reject chute 92, 93 to be moved by the conveyor chain to the left and forward as guided by guide rails 110–113 to the reject bin 100.

Figure 5:
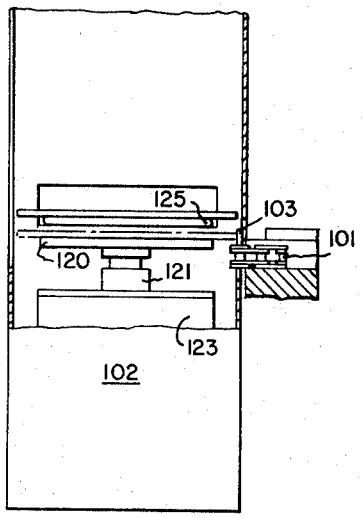
FIG. 5 is a fragmentary side elevational view of the slide elevator mechanism at either the accept or reject slide storage bins.
Figure 6:
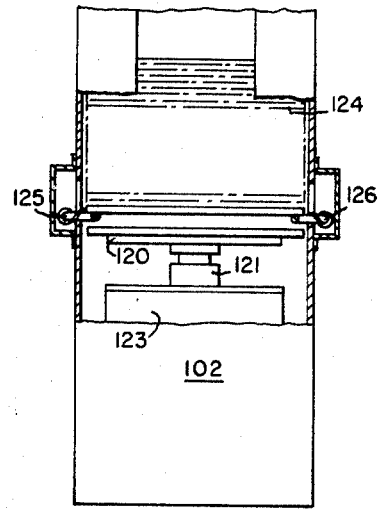
FIG. 6 is a view similar to FIG. 5 but as seen from the front with a stack of stored slides supported in the elevated storage position.
Figure 7:
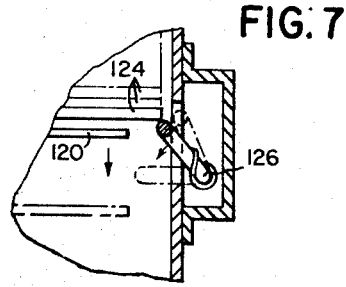
FIG. 7 is a view similar to FIG. 6 but showing the slide elevator catches in the process of trapping the lowermost stored slide as the slide elevator is lowered.

Referring now to FIGS. 5–7 of the drawings along with FIG. 1, the reject and accept bins 100, 102 are substantially identical and the slide elevator mechanisms are the same so that a description of the slide elevator mechanisms for the accept slide bin 102 will suffice for both bins 100 and 102. A solenoid moved platform 120 is supported in a normal lower rest position on the end of a solenoid armature 121 in a position to receive a slide as shown by FIG. 5 to be deposited thereon by the conveyor pin 103. As will be seen by FIG. 1 of the drawings, a slide being moved by conveyor pin 103 towards the accept bin 102 will pass under the switch arm 122 to momentarily energize the elevator platform solenoid 123 to momentarily raise and lower the platform with any previously deposited slide to be trapped under a previously supported pile of slides 124 by means of the pivotal slide catches 125, 126. Thus the elevator platform 120 is cleared in advance of the next slide to be deposited thereon by the accept transport conveyor pin 103. Similarly, the switch arm 127 for the reject conveyor track will be momentarily operated by the passage of a rejected slide to the reject slide storage bin 100 to correspondingly operate its slide storage elevator mechanism. FIG. 7 of the drawings shows in detail the pivotal motion of one of the slide elevator catches 125, 126 as the elevator platform drops back to the normal position as cleared to receive another slide from the reject or accept conveyor as the case may be.

Referring to FIG. 4 of the drawings, one form of automatic slide feed mechanism from the input slide storage bin 31 will be described although it should be understood that such mechansims are well known and any suitable arrangement may be used. An input slide cycle motor 130 rotates a crank arm 131 which reciprocates a connecting rod 132 to reciprocate a slide feed finger 133 to advance the bottom slide in the stack 31 onto the incline slide input chute 70. As will be more particularly described in connection with the control circuit shown by FIG. 8, the input slide motor is cycled to reciprocate the slide feed finger once at the end of each transport cycle for the transport conveyor 25 thus automatically depositing a slide in the central position on the conveyor 25 to be moved selectively to either the right or left projection position when a corresponding one of the left or right accept or reject buttons 32–35 is next operated.

Referring now to FIG. 8 of the drawings, one form of a control circuit suitable to be used with the comparator of the invention will be described. A main off-on switch 150 connects a source of alternating current to the direct current supply converter 151 for providing twelve and twenty-four volt direct current to operate the various motors, relays and solenoids as will be described. The right accept push button switch is shown at 32 and right reject push button switch is shown at 33 while similar left accept and reject push button switches are shown at 34, 35. Each of the switches 32–35 are provided with respective dashpots 32a–35a to provide a slight operate holding period for the respective switch after it has been momentarily depressed and operated. This holding period is necessary to enable the transport conveyor drive carriage to be moved from the central position either left or right momentarily operating the center stop switch 152 by either carriage switch operating pin 153, 154 but with the effect of the operated center stop switch 152 being nullified during the held operated condition of any one of the push button accept or reject switches 32–35. The right drive solenoids 55, 57 and the left drive solenoids 56, 58 are controllably energized such that when either the right accept or reject buttons 32, 33 are operated the right drive solenoids 55, 57 will be energized and when either left accept or reject buttons 34, 35 are operated the left drive solenoids 56, 58 will be energized from 24 v. D.C. If either right accept or reject push button 32, 33 is momentarily depressed the holding relay K1 will be operated and held to maintain the energization of the right drive solenoids 55, 57. Similarly, if either left accept or reject push button 34, 35 is momentarily depressed, the holding relay K2 will be operated and held. The right holding relay K1 will remain operated by its holding circuit including the right limit switch 60 until the transport conveyor drive carriage 51 reaches the extreme right position at which time the right limit switch 60 is momentarily operated to open the holding circuit and de-energize the holding relay K1. Similarly, the left holding relay K2 will remain operated until the left limit switch 61 is momentarily operated by the transport conveyor drive carriage in the extreme left position.

When either the right reject or accept buttons 32, 33 are momentarily depressed the transport carriage drive motor 54 which is a permanent magnet reversible twelve volt direct current motor is connected to the twelve volt direct current source by the operation of the latch relay motor run and direction switches K3A and K4A, respectively, with a polarity to be selectively rotated in a direction to drive the transport carriage 51 to the right from the central position. When the extreme right position for the carriage 51 is reached, the momentary operation of the right limit switch 60 de-energizes hold relay K1 to de-energize the right drive solenoids 55, 57 and operate latch direction relay K4B to reverse the carriage drive motor 54 to return the carriage to the center position at which time the center stop switch 152 is energized to operate latch motor run switch K3B to open the circuit and stop carriage drive motor 54 with the transport conveyor carriage 51 again in the center position. Similarly, if either the left accept or reject buttons 34, 35 is operated the latch direction control relays K4A and K4B and the motor run latch relays K3A and K3B will be operated except in a sequence to apply direct current to the carriage drive motor 54 with a polarity to drive the carriage to the left extreme position and return to the center position.

When the right slide accept push button 32 is depressed, the right accept trap operating solenoid 82a will be momentarily energized to deposit the accepted slide at the right projection position 27 on the accept chute 91. When the right slide reject push button 33 is depressed, the right reject trap operating solenoid 83a will be momentarily operated to deposit a slide at the right reject position 30 onto the right reject chute 93. Similarly, when the left slide accept push button 34 is momentarily depressed, the left accept trap solenoid 82 will be momentarily energized to deposit the left accepted slide at the left projection position 28 onto the left accept chute 90 while if the left reject button 35 is momentarily depressed, the left reject trap solenoid 83 will be momentarily energized to deposit a rejected slide on the left reject slide chute 92. As previously described, the endless conveyor chain 101 is being continuously driven by the alternating current driven motor 160 to advance the rejected slides along the reject slide conveyor track to the reject storage bin 100 and along the accept slide conveyor track to the accept storage bin 102. The accept storage elevator solenoid 123 and associated operating switch 122 together with the reject storage elevator solenoid 128 and associated operating switch 127 are shown by FIG. 8 of the drawings to be operated by the tweny-four volt direct current supply.

During automatic operation of the comparator, the manual-automatic selection control switch 161 is closed to supply alternating current through the contacts of relay K5 to the automatic slide insert motor 130. Relay K5 is caused to be operated by the momentary operation of carriage center stop switch 152 as the transport conveyor drive carriage returns to the center position. Relay K5 remains energized by a holding circuit including the contacts of the cycle switch 162 which are closed as soon as the insert motor 130 starts upon the initial energization of relay K5. Thus, one complete reciprocation of the slide insert finger 133 is obtained by the operation of the insert motor 130 before the relay K5 is again de-energized by the opening of the cycle switch 162 to open the circuit for the slide insert motor 130. While the cycle switch 162 is closed the secondary cycle switch 163 is also closed to apply twenty-four volts direct current to energize the slide centering solenoid 72 so that the centering pin 71 will be withdrawn until a new slide is deposited at the end of the slide insert cycle as previously described.

If it is desired to manually insert slides by the chute 36, the manual-automatic selection switch 161 is opened to open the circuit to the insert drive motor 130 and the manual push button 164 may be depressed to energize the centering pin solenoid 72 while a slide is being manually inserted. The focus motors 15, 16 which are conventional 12 v. polarity reversible direct current motors are connected with the desired polarity of direct current through the push button switches 17–20 as shown by FIG. 8.

There has been described a photographic slide comparator with which a single stack of slides may be automatically separated into a stack of accepted and a stack of rejected slides after the simultaneously viewing and comparing of two slides at a time. After each viewing and comparison, a suitable push button may be operated to automatically accept or reject a desired one of the two slides while at the same time substituting a new slide for the particular rejected or accepted slide. Various modifications will occur to those skilled in the art and no attempt is made to describe all of the possible combinational sequence of operations that may be available with the arrangement and control circuit of this invention.

What is claimed is:

1. A slide transparency comparator comprising a first projector lamp assembly with lens and viewing screen, a second projector lamp assembly with lens and viewing screen, a slide transport conveyor adapted to move a slide from a central position to a projection position at a selected one of said projector assemblies and to move a slide from a projection position to an associated reject position on the transport conveyor, an accept bin for receiving slides after viewing, a reject bin for receiving slides after viewing, an accept slide conveyor adapted to convey a slide from either of said projection positions to said accept bin, a reject slide conveyor adapted to convey a slide from either of said associated reject positions to said reject bin, and control means to operate said transport and accept and reject conveyors for a given slide change cycle in a manner to convey a slide from the central position to a selected one of said projection positions while conveying a slide from the selected projection position to said accept bin and for another given slide change cycle in a manner to convey a slide from the central position to a selected projection position while conveying a slide from the projection position to the reject position and a slide from the reject position to the reject bin whereby slides may be simultaneously projected by both projector assemblies for comparative viewing and selected ones of the slides from either of said projection positions may be selectively received in said accept and reject bins.

2. The invention of claim 1 in which each of said projector assemblies are positioned in side-by-side spaced apart relation and said transport conveyor extends between said projector assemblies, a slide magazine is positioned approximately midway between said projector assemblies, means to move a slide from said magazine to the central position of said transport conveyor prior to the operation of said transport conveyor, and said control means being adapted to move said transport conveyor from the central position with a slide to deposit the slide at a selected projection position and to return the transport conveyor without the slide to the central position during each slide change cycle.

3. The invention of claim 2 in which said means to move a slide from said magazine to a central position on said transport conveyor is operated by said control means as said transport conveyor returns to the central position at the end of each slide change cycle.

4. The invention of claim 1 in which each of said accept and reject bins includes a respective slide elevating platform together with pivotal slide catches positioned in the respective bins above the respective slide elevator to support a slide raised by the respective elevator in the elevated position within the respective bin, operating means is associated with said slide accept conveyor to be operated by passage of a slide on said accept slide conveyor to raise and lower the elevating platform of the accept bin before a slide is deposited by the accept slide conveyor on the accept slide elevating platform, and operating means is associated with said slide reject conveyor to be operated by passage of a slide on said reject slide conveyor to raise and lower the elevating platform of the reject bin before a slide is deposited by the reject slide conveyor on the reject slide elevating platform.

5. The invention of claim 1 in which said accept slide conveyor and said reject slide conveyor are comprised of an endless movable slide moving member movable in one direction within an accept slide guideway towards the accept bin and movable in the opposite direction within a reject slide guideway towards the reject bin.

6. The invention of claim 5 in which respective slide guide chutes are positioned between said transport conveyor at the respective projection positions and said accept slide guideway and said control means is adapted to move a slide from a selected projection position through said guide chute to the accept slide conveyor guideway.

7. The invention of claim 6 in which said control means includes a respective movable switch element at the respective projection position in the transport conveyor to be moved to deposit a slide on the respective guide chute to the accept slide conveyor guideway for a given slide change cycle.

8. The invention of claim 1 in which said accept slide conveyor and said reject slide conveyor are comprised of an endless movable slide moving member movable in one direction within an accept slide guideway towards the accept bin and movable in the opposite direction within a reject slide guideway towards the reject bin, respective slide guide chutes are positioned between the transport conveyor at the respective projection positions and said accept slide guideway, respective slide guide chutes are positioned between the transport conveyor at the associated reject positions and the reject slide guideway, and said control means and said transport conveyor are arranged to selectively move a slide from a selected projection position through one of said chutes to said accept slide guideway for a given slide change cycle and to move a slide from a selected associated reject position on said transport conveyor through one of said chutes to said reject slide guideway for another given slide change cycle.

9. The invention of claim 8 in which said control means includes respective movable switch elements at the respective projection and reject positions in the transport conveyor to be moved to deposit a slide from a given one of the projection and reject positions to deposit a slide on the respective guide chute to the respective accept and reject slide conveyor guideways for a given slide change cycle.

References Cited

UNITED STATES PATENTS

| 3,025,756 | 3/1962 | Howell et al. | 353—37 |
| 3,093,030 | 6/1963 | Carrillo | 353—86 |
| 3,124,260 | 3/1964 | Tidball | 353—25 X |
| 3,153,870 | 10/1964 | Carlton | 353—25 X |
| 3,239,955 | 3/1966 | Amelotte | 353—9 X |

NORTON ANSHER, Primary Examiner

R. M. SHEER, Assistant Examiner

U.S. Cl. X.R.

40—79; 353—25, 94, 113, 166